United States Patent
Englmaier et al.

(10) Patent No.: US 12,539,480 B2
(45) Date of Patent: Feb. 3, 2026

(54) FILTER SYSTEM, FILTER ELEMENT, AND USE

(71) Applicant: MANN+HUMMEL GmbH, Ludwigsburg (DE)

(72) Inventors: Michael Englmaier, Portage, MI (US); David Kolar, Sachsenheim (CZ); Daniel Schmid, Sachsenheim (DE); Dennis Stark, Mauer (DE); Ondrej Kult, Jihlava (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 354 days.

(21) Appl. No.: 18/308,840

(22) Filed: Apr. 28, 2023

(65) Prior Publication Data

US 2023/0256372 A1  Aug. 17, 2023

Related U.S. Application Data

(63) Continuation of application No. PCT/EP2021/080335, filed on Nov. 2, 2021.

(51) Int. Cl.
*B01D 46/00* (2022.01)

(52) U.S. Cl.
CPC .... *B01D 46/0004* (2013.01); *B01D 2265/028* (2013.01); *B01D 2271/027* (2013.01)

(58) Field of Classification Search
None
See application file for complete search history.

(56) References Cited

U.S. PATENT DOCUMENTS

| | | |
|---|---|---|
| 1,024,554 A | 4/1912 | Carter et al. |
| 5,484,466 A | 1/1996 | Brown et al. |
| 5,487,767 A | 1/1996 | Brown et al. |
| 5,556,440 A | 9/1996 | Mullins et al. |
| 5,702,602 A | 12/1997 | Brown et al. |
| 5,730,769 A | 3/1998 | Dungs et al. |
| 5,755,842 A | 5/1998 | Patel et al. |
| 5,800,581 A | 9/1998 | Gielink et al. |
| 5,895,510 A | 4/1999 | Butler et al. |
| 6,099,606 A | 8/2000 | Miller et al. |
| 6,167,862 B1 | 1/2001 | Powell et al. |
| 6,383,244 B1 | 5/2002 | Wake et al. |
| 6,569,219 B1 | 5/2003 | Connor et al. |
| 6,602,308 B1 | 8/2003 | Carle et al. |

(Continued)

FOREIGN PATENT DOCUMENTS

| | | |
|---|---|---|
| CN | 102179121 A | 9/2011 |
| CN | 208441944 U | 1/2019 |

(Continued)

*Primary Examiner* — Brit E. Anbacht

(57) ABSTRACT

A filter system is provided with a filter housing provided with a fluid inlet for introduction of a fluid into the filter housing. A fluid outlet for discharge of the fluid from the filter housing is provided. A filter element is removably received in the filter housing, wherein the filter element has a positioning and sealing section which positions and seals the filter element in relation to the filter housing. Elastically deformable snap elements connect the filter housing and the fluid outlet with form fit to each other. The positioning and sealing section rests radially at the elastically deformable snap elements. A filter element for such a filter system is provided.

15 Claims, 11 Drawing Sheets

(56) References Cited

U.S. PATENT DOCUMENTS

| | | |
|---|---|---|
| 6,641,637 B2 | 11/2003 | Kallsen et al. |
| 7,608,184 B2 | 10/2009 | Weindorf et al. |
| 7,959,703 B2 | 6/2011 | Merritt et al. |
| 8,147,576 B2 | 4/2012 | Gillenberg et al. |
| 8,349,048 B2 | 1/2013 | Volkmann |
| 8,501,002 B2 | 8/2013 | Knickmann et al. |
| 8,746,462 B2 | 6/2014 | Mbadinga-Mouanda et al. |
| 8,753,415 B2 | 6/2014 | Coulonvaux et al. |
| 9,108,137 B2 | 8/2015 | Kaufmann et al. |
| 9,346,001 B2 | 5/2016 | Kato et al. |
| 9,358,489 B2 | 6/2016 | Kaufmann et al. |
| 10,307,704 B2 | 6/2019 | Scott et al. |
| 10,786,772 B2 | 9/2020 | Baseotto et al. |
| 11,331,609 B2 | 5/2022 | Osendorf et al. |
| 11,478,741 B2 | 10/2022 | Scott et al. |
| 11,554,338 B2 | 1/2023 | Adamek et al. |
| 2002/0073665 A1 | 6/2002 | Gieseke et al. |
| 2002/0112459 A1 | 8/2002 | Andress et al. |
| 2002/0152732 A1 | 10/2002 | Kallsen et al. |
| 2004/0134171 A1 | 7/2004 | Scott et al. |
| 2006/0107638 A1 | 5/2006 | Holzmann et al. |
| 2006/0283160 A1 | 12/2006 | Johnson et al. |
| 2007/0222218 A1 | 9/2007 | Dworatzek et al. |
| 2007/0240394 A1 | 10/2007 | Ehrenberg et al. |
| 2007/0284301 A1 | 12/2007 | Dworatzek et al. |
| 2009/0049814 A1 | 2/2009 | Baseotto et al. |
| 2009/0217632 A1 | 9/2009 | Coulonvaux et al. |
| 2009/0223187 A1 | 9/2009 | Nelson et al. |
| 2009/0230051 A1 | 9/2009 | Holmes et al. |
| 2009/0320424 A1 | 12/2009 | Merritt et al. |
| 2010/0037575 A1 | 2/2010 | Mouatt |
| 2010/0146917 A1 | 6/2010 | Coulonvaux et al. |
| 2010/0146920 A1 | 6/2010 | Iddings et al. |
| 2010/0263339 A1 | 10/2010 | Steins et al. |
| 2011/0232245 A1 | 9/2011 | Protasiewicz et al. |
| 2011/0247582 A1 | 10/2011 | Blossey et al. |
| 2011/0308212 A1 | 12/2011 | Ruhland et al. |
| 2012/0031060 A1* | 2/2012 | Iddings .............. B01D 46/0002 55/502 |
| 2012/0055126 A1 | 3/2012 | Whittier et al. |
| 2012/0159915 A1 | 6/2012 | Heckel et al. |
| 2013/0263744 A1 | 10/2013 | Osendorf et al. |
| 2014/0137525 A1 | 5/2014 | Cambpell et al. |
| 2014/0165834 A1 | 6/2014 | Kaufmann et al. |
| 2014/0230387 A1 | 8/2014 | Kawabe et al. |
| 2015/0059297 A1 | 3/2015 | Ruhland et al. |
| 2015/0060351 A1 | 3/2015 | Kaufmann et al. |
| 2015/0082982 A1 | 3/2015 | Ruhland et al. |
| 2016/0296867 A1 | 10/2016 | Stark et al. |
| 2016/0375382 A1* | 12/2016 | Girondi ................. B01D 35/30 210/232 |
| 2017/0014746 A1* | 1/2017 | Smith ................ B01D 46/0031 |
| 2017/0246571 A1* | 8/2017 | Adamek ............ B01D 46/0001 |
| 2017/0291129 A1 | 10/2017 | Sorger |
| 2018/0245548 A1 | 8/2018 | Varghese et al. |
| 2019/0060816 A1 | 2/2019 | Wittmers et al. |
| 2019/0299143 A1 | 10/2019 | Decoster et al. |
| 2020/0023296 A1 | 1/2020 | Stark et al. |
| 2020/0155988 A1 | 5/2020 | Campbell et al. |
| 2021/0086118 A1 | 3/2021 | Tripathi et al. |
| 2023/0058723 A1 | 2/2023 | Baseotto et al. |

FOREIGN PATENT DOCUMENTS

| | | |
|---|---|---|
| CN | 109595104 A | 4/2019 |
| DE | 2327727 A1 | 7/1974 |
| DE | 4342406 A1 | 6/1995 |
| DE | 19727369 A1 | 1/1999 |
| DE | 202006014784 U1 | 2/2008 |
| DE | 202007002117 U1 | 6/2008 |
| DE | 202007018072 U1 | 5/2009 |
| DE | 202008010504 U1 | 12/2009 |
| DE | 102008062954 A1 | 7/2010 |
| DE | 102015004089 A1 | 12/2015 |
| DE | 102016002954 A1 | 9/2016 |
| EP | 0664389 A1 | 7/1995 |
| EP | 1207295 A1 | 5/2002 |
| EP | 1839723 A1 | 10/2007 |
| EP | 2853305 A1 | 4/2015 |
| EP | 3427810 A1 | 1/2019 |
| GB | 1535789 A | 12/1978 |
| WO | 2006119414 A1 | 11/2006 |
| WO | 2009146962 A1 | 12/2009 |
| WO | 9011116 A1 | 8/2023 |

\* cited by examiner

FILTER SYSTEM, FILTER ELEMENT, AND USE

CROSS-REFERENCE TO RELATED APPLICATIONS

This application is a continuation application of international application No. PCT/EP2021/080335 having an international filing date of 2 Nov. 2021 and designating the United States, the international application claiming a priority date of 3 Nov. 2020 based on prior filed German patent application No. 10 2020 128 911.1, the entire contents of the aforesaid international application and the aforesaid German patent application being incorporated herein by reference.

BACKGROUND OF THE INVENTION

The present invention concerns a filter system and a filter element of such a filter system, as well as the use of a filter element in such a filter system.

A filter system can comprise a filter housing and a filter element removably received in the filter housing and comprising a folded filter medium. For supply of a fluid to be purified to the filter element, the filter housing comprises a fluid inlet. For discharge of the fluid purified from particles, a fluid outlet is provided. The fluid outlet can be a tubular component which is locked to or snapped to a housing bottom part of the filter housing. From the prior art, for example, DE 11 2012 004 521 T5 or US 2020/0155988 A1, such locking or snap connections are known in which the fluid outlet comprises a circumferentially extending ring-shaped locking edge behind which a plurality of elastically deformable snap elements lock which are arranged so as to circumferentially extend at the housing bottom part of the filter housing; for this purpose, they are temporarily deformed radially outwardly in an elastic manner upon assembly, are moved across the locking edge upon insertion of the fluid outlet into the housing bottom part, and, after having overcome the locking edge, move again radially inwardly and can lock behind or snap into place at the locking edge. Due to vibrations in operation of the filter system, small relative movements between the fluid outlet and the housing bottom part may occur, in particular in the region of the snap connection. These relative movements can lead to a noise development. Moreover, these relative movements can also lead to wear at the fluid outlet and/or at the housing bottom part. This is to be avoided.

SUMMARY OF THE INVENTION

In view of this background, the present invention has the object to provide an improved filter system.

Accordingly, a filter system is proposed, comprising a filter housing which comprises a fluid inlet for introducing a fluid into the filter housing; a fluid outlet for discharging the fluid from the filter housing; a filter element removably received in the filter housing and comprising a positioning and sealing section for positioning and sealing the filter element in relation to the filter housing; and elastically deformable snap elements by means of which the filter housing and the fluid outlet are connected with form fit to each other, wherein the positioning and sealing section in particular rests radially at the snap elements and is preferably pressed against the snap elements, in particular pressed radially against the snap elements.

Since the positioning and sealing section is pressed radially against the snap elements, the positioning and sealing section acts in a supporting and damping manner on the snap elements so that the latter in operation of the filter system cannot perform relative movements, for example, caused by vibrations. In this way, a noise development, for example, by rattling of the snap elements, and wear of the snap elements, are reliably prevented.

Preferably, the snap elements engage with form fit in an engagement section for form fit connection of the filter housing and of the fluid outlet.

Preferably, the snap elements comprise a side which is facing the engagement section and a side which is facing away from the engagement section. Preferably, the positioning and sealing section is resting radially at the sides of the snap elements which are facing away from the engagement section.

The filter system is preferably an air filter system. Correspondingly, the filter element is an air filter element. The filter system, for example, is an intake air filter for an internal combustion engine. The filter housing comprises preferably a cup-shaped housing bottom part as well as a housing top part which is removable from the housing bottom part. The filter element, for exchanging the same, can be removed from the filter housing and exchanged. The fluid inlet is preferably tubular. For example, the fluid inlet is arranged laterally at the housing bottom part. The fluid to be purified flows thus in particular perpendicularly in relation to a symmetry axis of the filter system against the filter medium. The purified fluid exits the filter housing through the fluid outlet. The fluid outlet is attached in particular to the housing bottom part. The fluid outlet can be part of the filter housing, in particular of the housing bottom part. However, this does not preclude that the fluid outlet can be separated, in particular without causing destruction, from the filter housing, in particular from the housing bottom part.

The filter medium is preferably a folded bellows folded in a zigzag shape. The filter medium can be cylinder-shaped. The filter medium, viewed along the symmetry axis, is arranged between a first end disk and a second end disk. The end disks are attached to end faces of the filter medium. In particular, the end disks are connected fixedly to the filter medium. The end disks are preferably manufactured of an elastically deformable plastic material, for example, of a polyurethane. For example, the end disks can be cast onto or fused onto the filter medium. The end disks, for example, can be manufactured of a foamed polyurethane.

The first end disk comprises preferably a central passage through which the fluid outlet is inserted into the filter housing, in particular into the filter element. The second end disk is preferably fluid-tight and closes the filter medium at the end. The positioning and sealing section which extends in a ring shape about the symmetry axis is provided preferably at the first end disk. At the outer side, i.e., facing away from the symmetry axis, the positioning and sealing section can have depressions or recesses in which corresponding engagement elements of the housing bottom part can engage with form fit. In this way, positioning of the filter element in relation to the housing bottom part can be achieved, on the one hand, and, on the other hand, it can be prevented that filter elements without such recesses which do not belong to the filter system can be mounted in the housing bottom part.

The fluid is introduced as fluid to be purified from particles, such as, for example, dust, small stones, plant parts or the like, through the fluid inlet into the filter housing. The fluid to be purified flows then from a raw side of the filter element through the filter medium to a clean side of the filter element. From the clean side, the purified fluid is guided through the fluid outlet away from the filter system and supplied to an internal combustion engine, for example. The fluid is in particular air.

The snap elements can be provided either at the filter housing, in particular at the housing bottom part, or at the fluid outlet. Furthermore, the snap elements can also be separate components. The snap elements are elastic, in particular elastically deformable. This means the snap elements can be brought from an undeformed or non-deformed state into a deformed or distorted state. In this context, the snap elements are however pretensioned in the direction of the undeformed state, in particular spring preloaded. This means that for moving the snap elements from the undeformed state into the deformed state, a force must be applied onto the snap elements. As soon as this force is no longer acting, the snap elements rebound or move automatically back from the deformed state into the undeformed state.

A form fit connection is produced by the mutual engagement or engagement from behind of at least two connection partners, presently the snap elements and the filter housing or the snap elements and the fluid outlet. A form fit connection can be separated again preferably without destruction. That the positioning and sealing section rests "radially" at the snap elements means presently preferably that the positioning and sealing section rests with friction and/or form fit at the snap elements, in particular rests thereat in a damping manner for damping movements and/or vibrations of the snap elements which may be generated, for example, due to outer excitation such as vibrations in operation. That the positioning and sealing section is pressed "radially" against the snap elements means presently that the positioning and sealing section applies a force on the snap elements which is oriented in or opposite to a radial direction of the filter system. The radial direction in this context is perpendicular to the symmetry axis and preferably oriented away from the latter. The radial direction can also be oriented toward the symmetry axis. That the positioning and sealing section is "pressed" against the snap elements means presently that the positioning and sealing section is forced in such a way against the snap elements that it is elastically deformed and in particular applies a radially acting force onto the snap elements.

In embodiments, the snap elements are provided at a housing bottom part of the filter housing, wherein the snap elements engage with form fit in an engagement section provided at the fluid outlet. Alternatively, the snap elements can also be provided at the fluid outlet, wherein the snap elements engage in an engagement section provided at the housing bottom part. The engagement section is preferably an annular groove which surrounds in a ring shape the afore mentioned symmetry axis and is integrally formed at the fluid outlet. As an alternative, the engagement section can be a ring-shaped edge at the housing bottom part which, upon installation, is overcome by snap elements arranged at the fluid outlet and is engaged from behind with form fit in the mounted state by snap elements arranged at the fluid outlet. For connecting the fluid outlet to the housing bottom part, the fluid outlet is passed through an outlet opening provided at the housing bottom part. In this context, the snap elements are deformed resiliently until they snap into or lock at the engagement section and connect the fluid outlet with form fit to the housing bottom part in this way. In this context, the snap elements are preferably resiliently deformed in a disengagement direction, in particular radially inwardly or outwardly, until they snap into or lock in the engagement section in a direction opposite to the disengagement direction and connect the fluid outlet with form fit to the housing bottom part in this way. The fluid outlet can be preferably separated again from the housing bottom part only in that the snap elements, for example, by means of a tool, are deformed and disengaged from the engagement section.

In embodiments, the snap elements are slanted at a slant angle in relation to a symmetry axis of the filter system. The number of snap elements is arbitrary. For example, thirteen such snap elements are provided which are arranged uniformly distributed around the symmetry axis. The snap elements project preferably radially into the outlet opening of the housing bottom part. The snap elements can extend, as an example and preferably, along the surface of a cone and/or form at least partially an outer surface of a truncated cone. It is understood that even when in this way a part of the extension direction of the snap elements comprises a radial component, the snap movement (in/opposite to the disengagement direction) occurs substantially in radial direction and the contact or the compression of the positioning and sealing section against the snap elements occurs in radial direction in a functionally decisive manner. However, this can still be provided for a slant of 45° relative to the center axis. Therefore, in this case one can also speak of a radial contact or a radial compression because a substantial direction component is oriented in radial direction.

In embodiments, a gap-shaped intermediate space is provided between two neighboring snap elements. This means the snap elements and the intermediate spaces are arranged alternatingly. The intermediate spaces are preferably oriented along planes extending through the center axis of the filter housing. This enables an individual snap movement of the individual snap elements.

Preferably, each snap element comprises a side which is facing the positioning and sealing section and a side which is facing away from the positioning and sealing section. In this context, the side which is facing away from the positioning and sealing section is preferably facing the engagement section. Preferably, each snap element comprises an outer side which is facing the positioning and sealing section and an inner side which is facing away from the positioning and sealing section. The positioning and sealing section rests at the outer sides of the snap elements. In the alternative case of snap elements positioned radially outwardly of the positioning and sealing section, each snap element comprises an inner side which is facing the positioning and sealing section and an outer side which is facing away from the positioning and sealing section. In this case, the positioning and sealing section then rests at the inner sides of the snap elements.

Preferably, the disengagement direction in the mounted state corresponds to a movement direction which is oriented toward the positioning and sealing section. This means that, in the mounted state or in operation, the part of the positioning and sealing section resting at the snap elements can damp and/or make difficult a movement of the snap elements in disengagement direction.

In embodiments, the positioning and sealing section comprises a contact surface which rests radially at the snap elements or is pressed radially against the snap elements and which is also slanted at a slant angle relative to the symmetry axis. The contact surface rests at the aforementioned outer sides or, alternatively, inner sides of the snap elements and pushes them against the engagement section of the fluid outlet.

In embodiments, the snap elements and a ring-shaped receiving flange provided at the housing bottom part form a connection interface of the housing bottom part. The receiving flange surrounds preferably completely the symmetry axis. In particular, the receiving flange surrounds the outlet opening of the housing bottom part.

In embodiments, the engagement section and a disk-shaped flange provided at the fluid outlet form a connection counter interface of the fluid outlet, wherein the connection interface and the connection counter interface interact with each other such that the snap elements engage with form fit in the engagement section and the flange is received in the receiving flange. In particular, the flange, when the latter is received in the receiving flange, rests at the end face at the housing bottom part, in particular at a bottom section of the housing bottom part. The flange extends laterally radially out of the fluid outlet and in particular surrounds it completely.

In embodiments, the fluid outlet is rotatable relative to the housing bottom part. In this way, it is possible to adapt the filter system to different application situations or installation situations. In particular, the fluid outlet is rotatably supported in or at the housing bottom part.

In embodiments, the fluid outlet comprises a seal interface with which a corresponding seal counter interface of the positioning and sealing section is radially compressed. The seal interface comprises preferably a seal surface which surrounds in a cylindrical shape the symmetry axis and against which a corresponding seal surface of the seal counter interface, which is also preferably cylindrical, can be radially compressed. Furthermore, the seal interface preferably comprises a rib which extends radially past the seal surface and which preferably surrounds completely the symmetry axis. The rib engages preferably with form fit in a preferably provided corresponding groove of the seal counter surface. In this way, an axial positioning of the filter element at the fluid outlet is possible.

Particularly preferred, the positioning and sealing section comprises a seal counter interface with a cylindrical seal surface and the contact surface. Further preferred, at the side of the seal surface which is facing away from the filter element, the contact surface adjoins axially in particular immediately the seal surface and forms further preferred a truncated cone-shaped ring. In a particularly preferred embodiment, the positioning and sealing section in this context is in the form of an annular bead which extends axially away from the filter element from an open end disk of the filter element and in particular is formed as one piece with the latter. In this context, the cylindrical seal surface and the contact surface are preferably arranged on the radially inwardly positioned side of the annular bead; alternatively, the cylindrical seal surface of the positioning and sealing section can be arranged at the radially inner side of the annular bead and the contact surface at the radially outer side of the annular bead or at least can be partially formed by the latter.

In embodiments, the fluid outlet comprises a lattice-shaped support tube section which projects into the filter element and a socket section which is bent in particular by 90° and projects out of the filter housing. The support tube section is suitable for supporting the filter medium in operation of the filter system from the inside. By means of the socket section, the purified fluid is discharged from the filter system. The socket section can extend along the symmetry axis or can be bent by 90° and thus be positioned perpendicularly in relation to the symmetry axis.

Furthermore, a filter element of such a system is proposed. The filter element, as mentioned before, is in particular an air filter element. The filter element comprises the first end disk and the second end disk between which the filter medium is arranged. The positioning and sealing section is integrally formed in particular at the first end disk.

Furthermore, the use of a filter element in such a filter system is proposed. The filter element, as mentioned before, is in particular an air filter element. The filter element comprises the first end disk and the second end disk between which the filter medium is arranged. The positioning and sealing section is integrally formed in particular at the first end disk.

BRIEF DESCRIPTION OF THE DRAWINGS

In the Figures, same or functionally the same elements, provided nothing to the contrary is indicated, are provided with the same reference characters.

DESCRIPTION OF PREFERRED EMBODIMENTS

Figure 1:
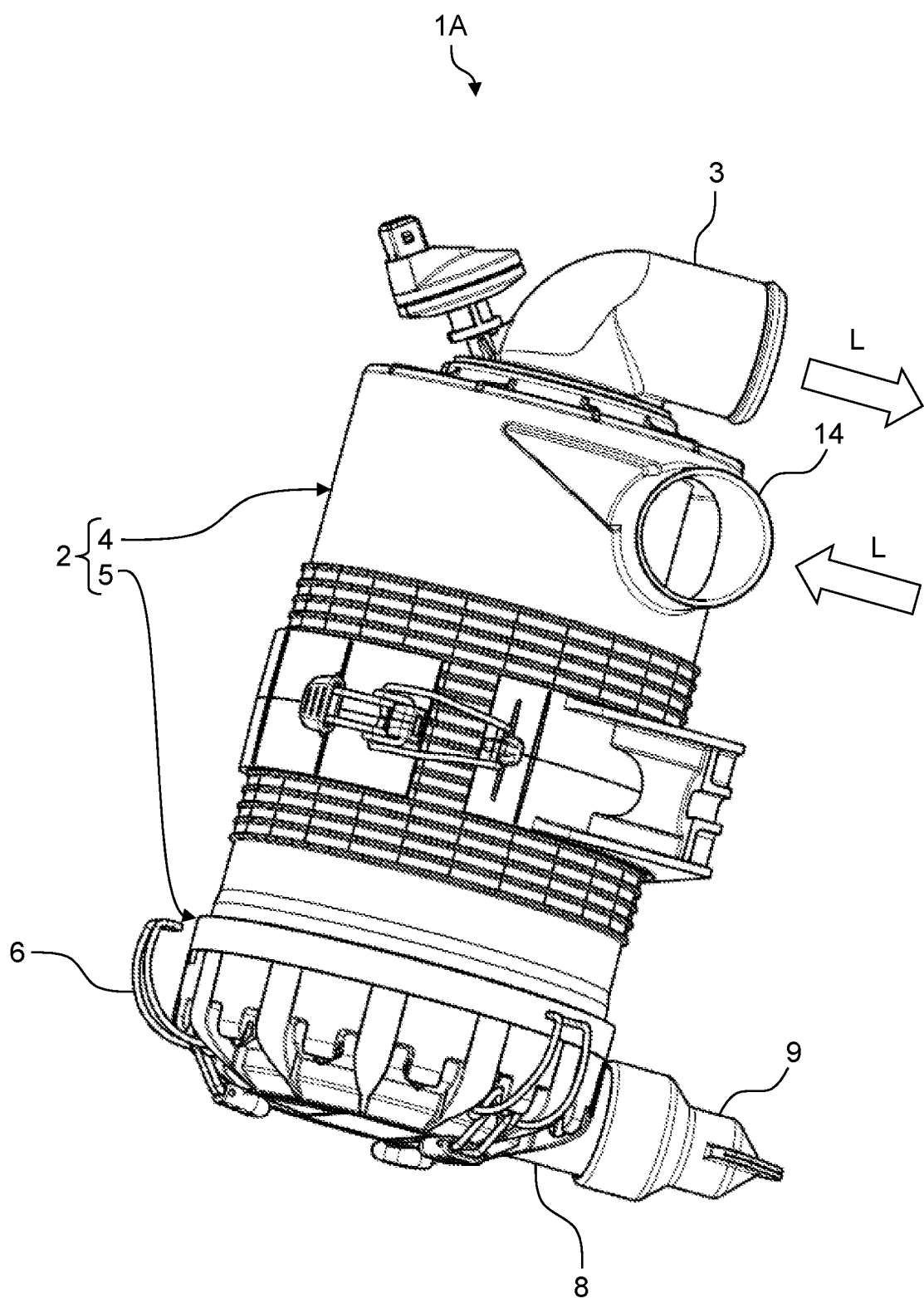
FIG. 1 shows a schematic perspective view of an embodiment of a filter system.
Figure 2:
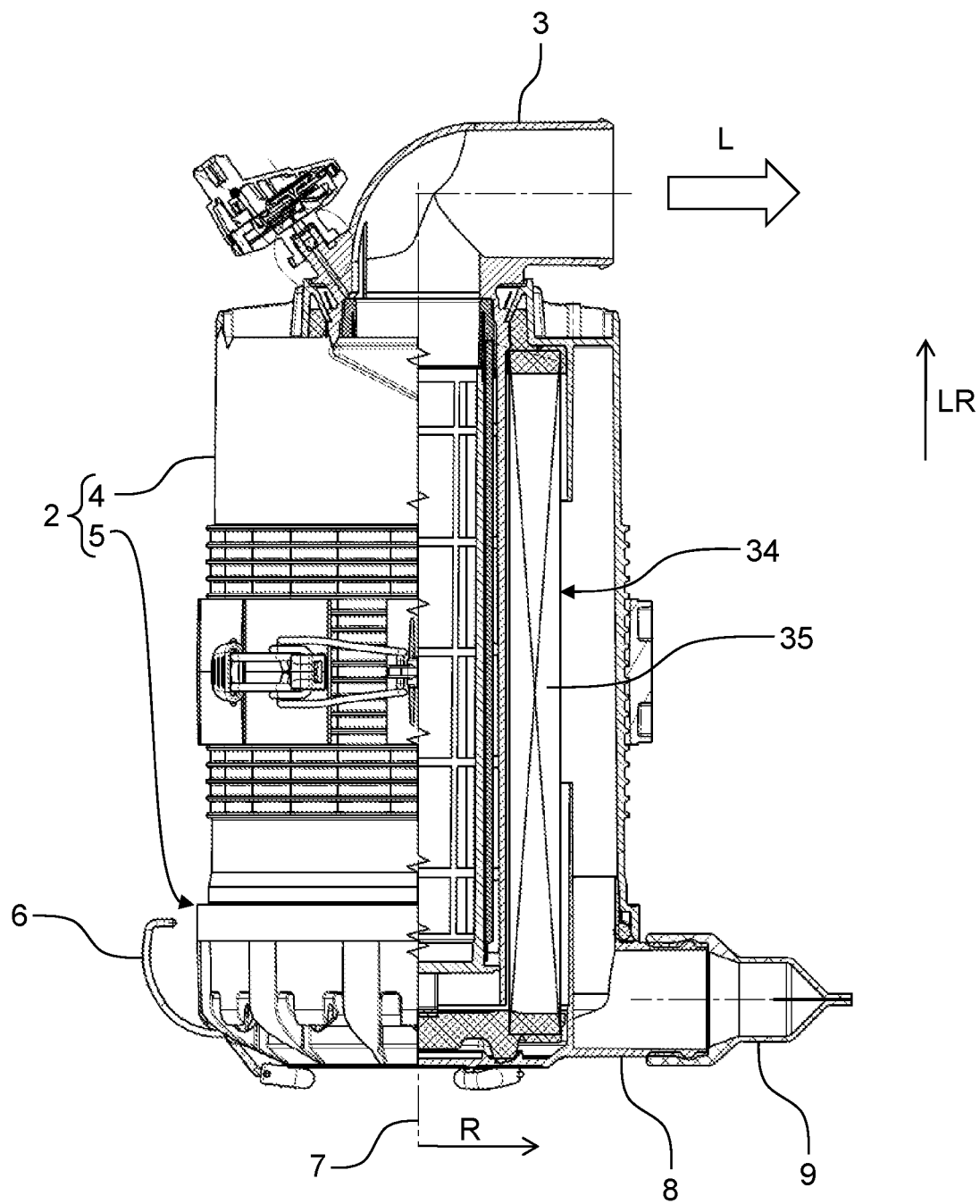
FIG. 2 shows a schematic partial section view of the filter system according to FIG. 1.
Figure 3:
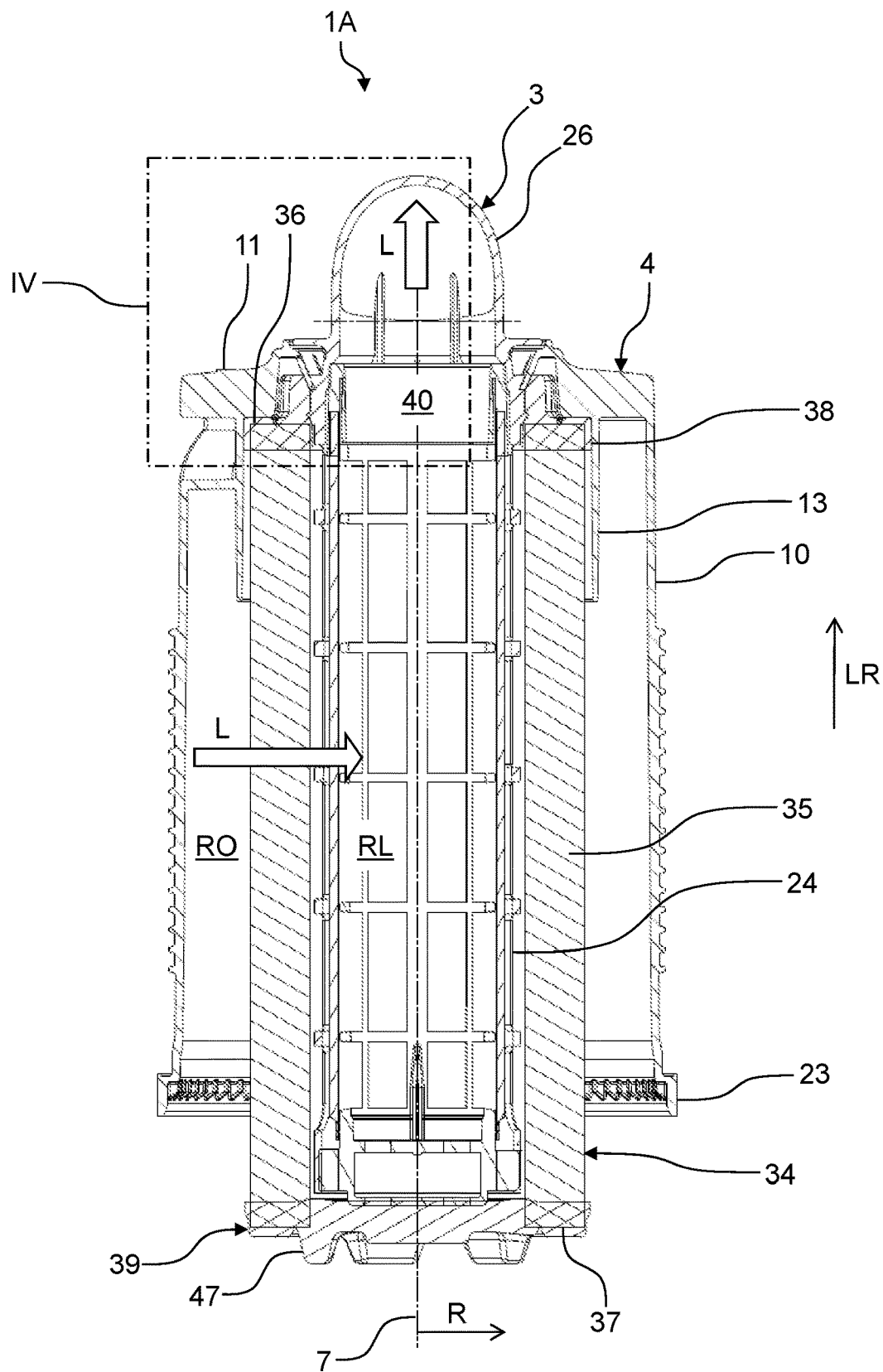
FIG. 3 shows a schematic section view of the filter system according to FIG. 1.
Figure 4:
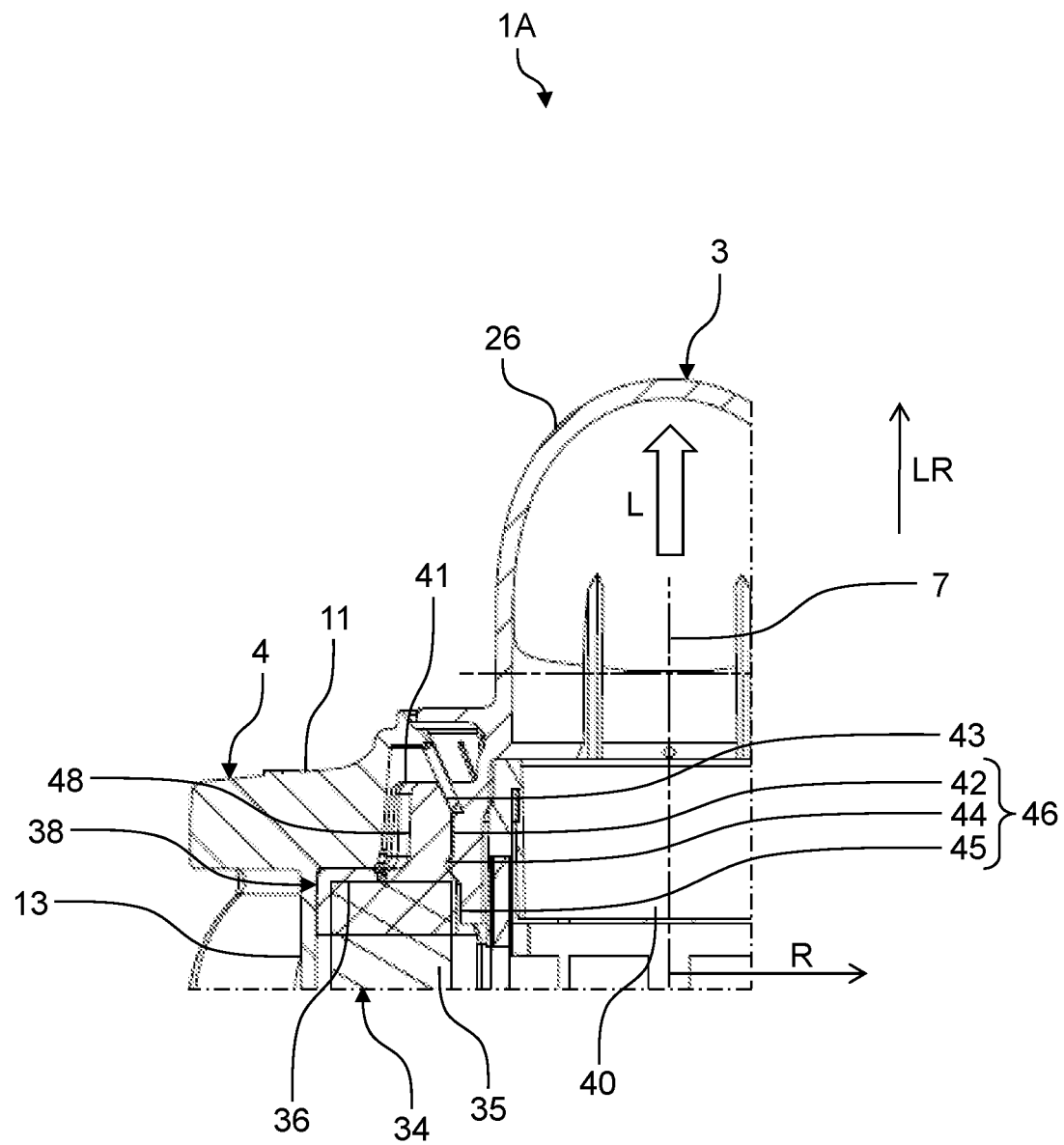
FIG. 4 shows a detail view IV according to FIG. 3.
Figure 5:
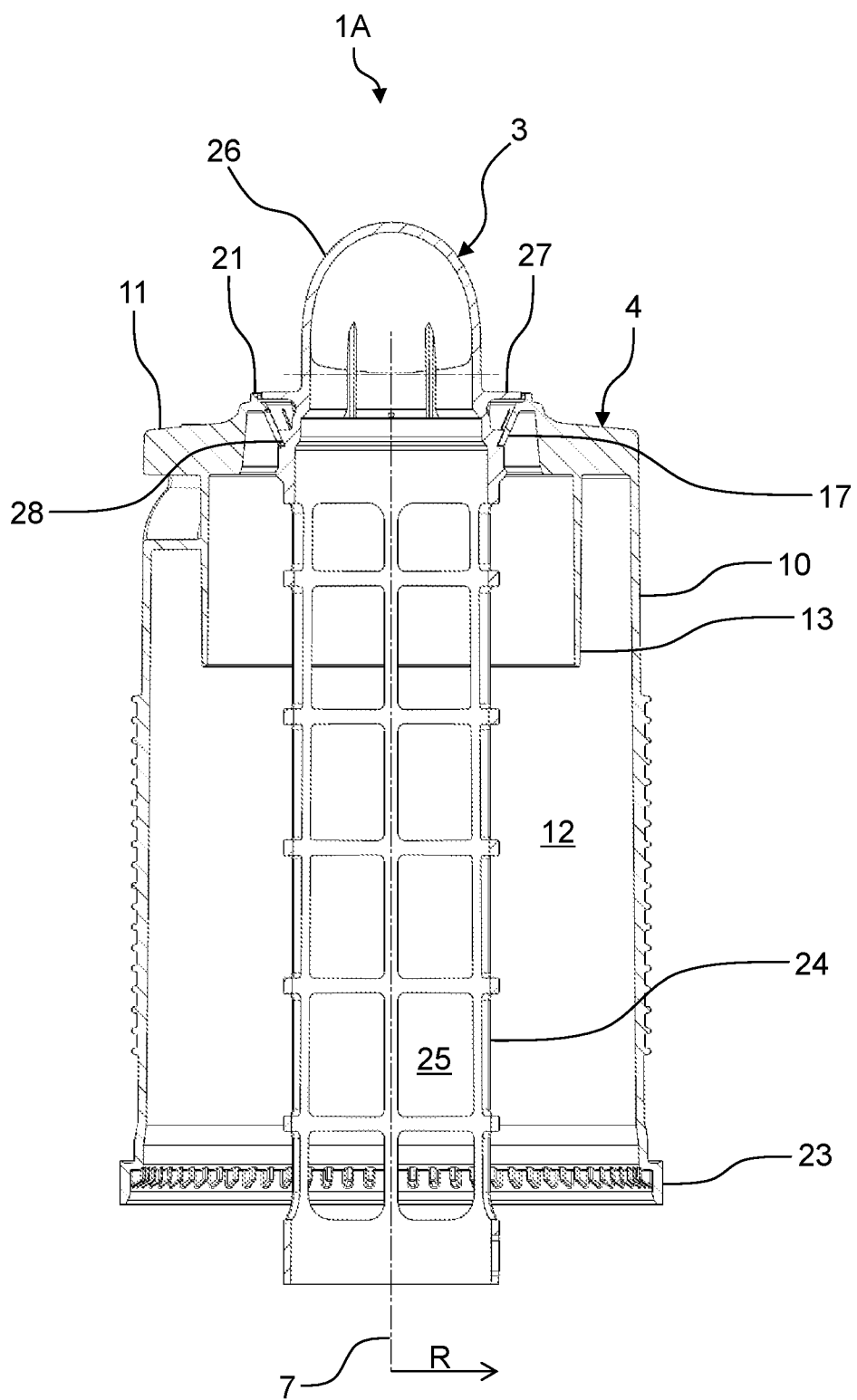
FIG. 5 shows a further schematic section view of the filter system according to FIG. 1.
Figure 6:
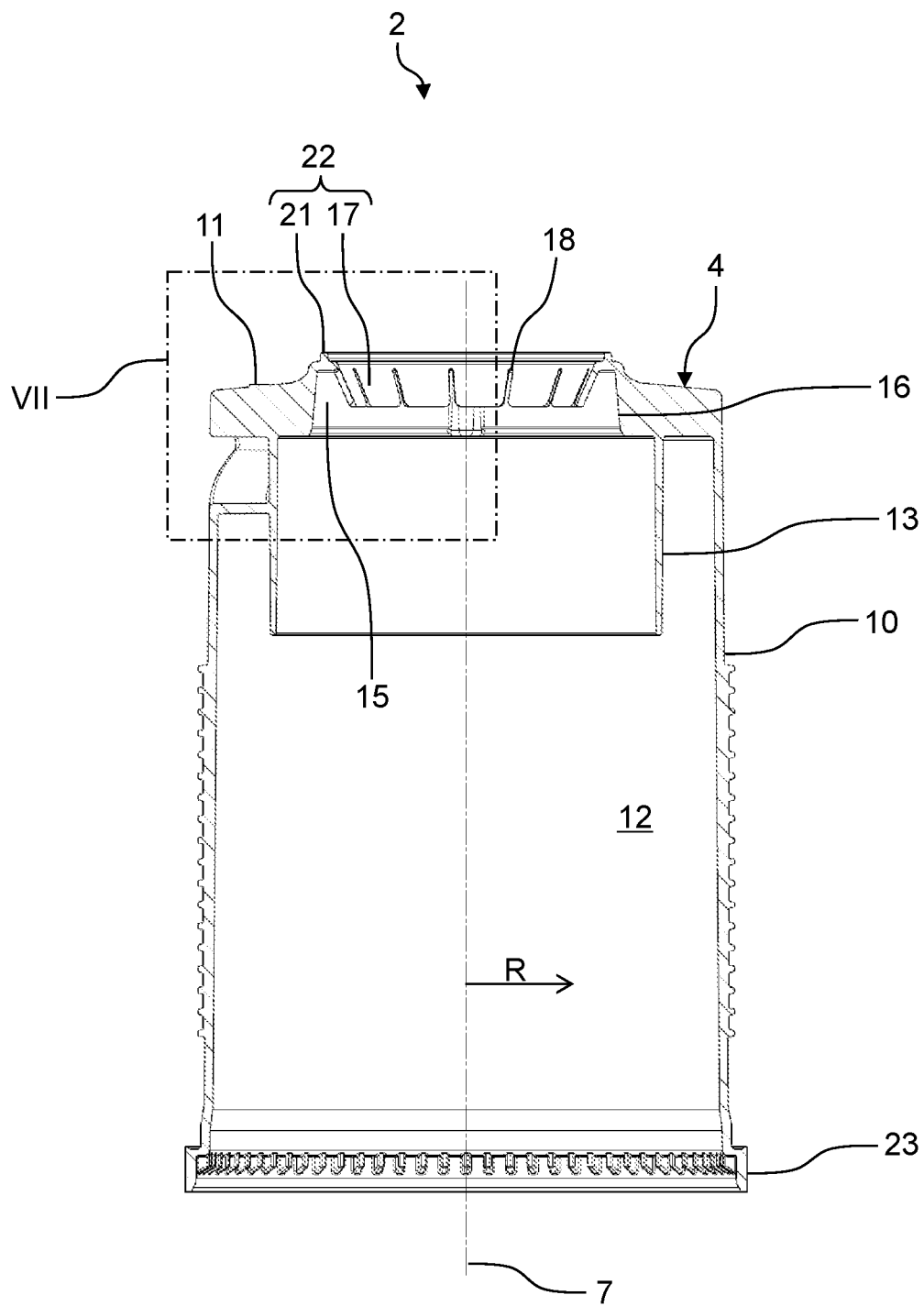
FIG. 6 shows a schematic section view of an embodiment of a filter housing for the filter system according to FIG. 1.
Figure 7:
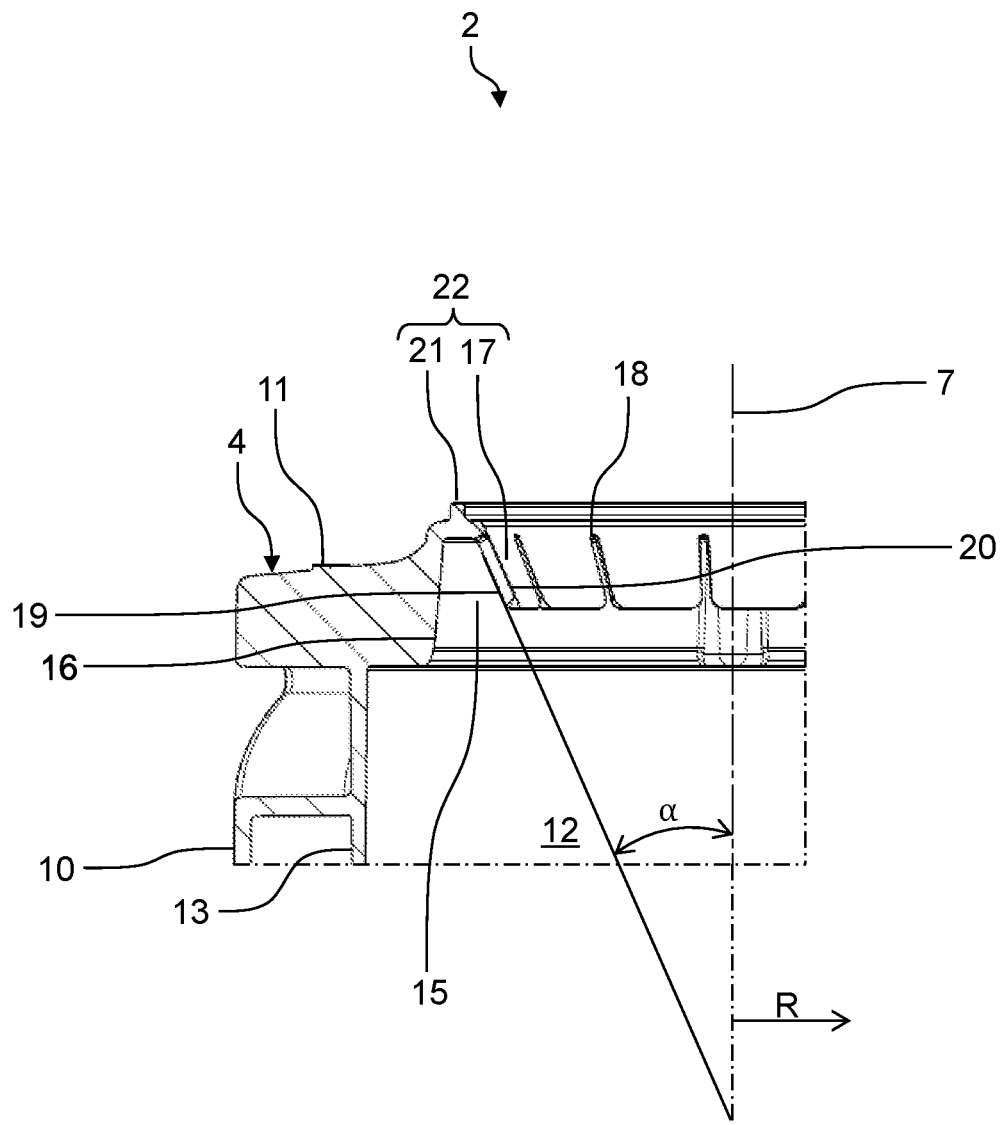
FIG. 7 shows a detail view VII according to FIG. 6.
Figure 8:
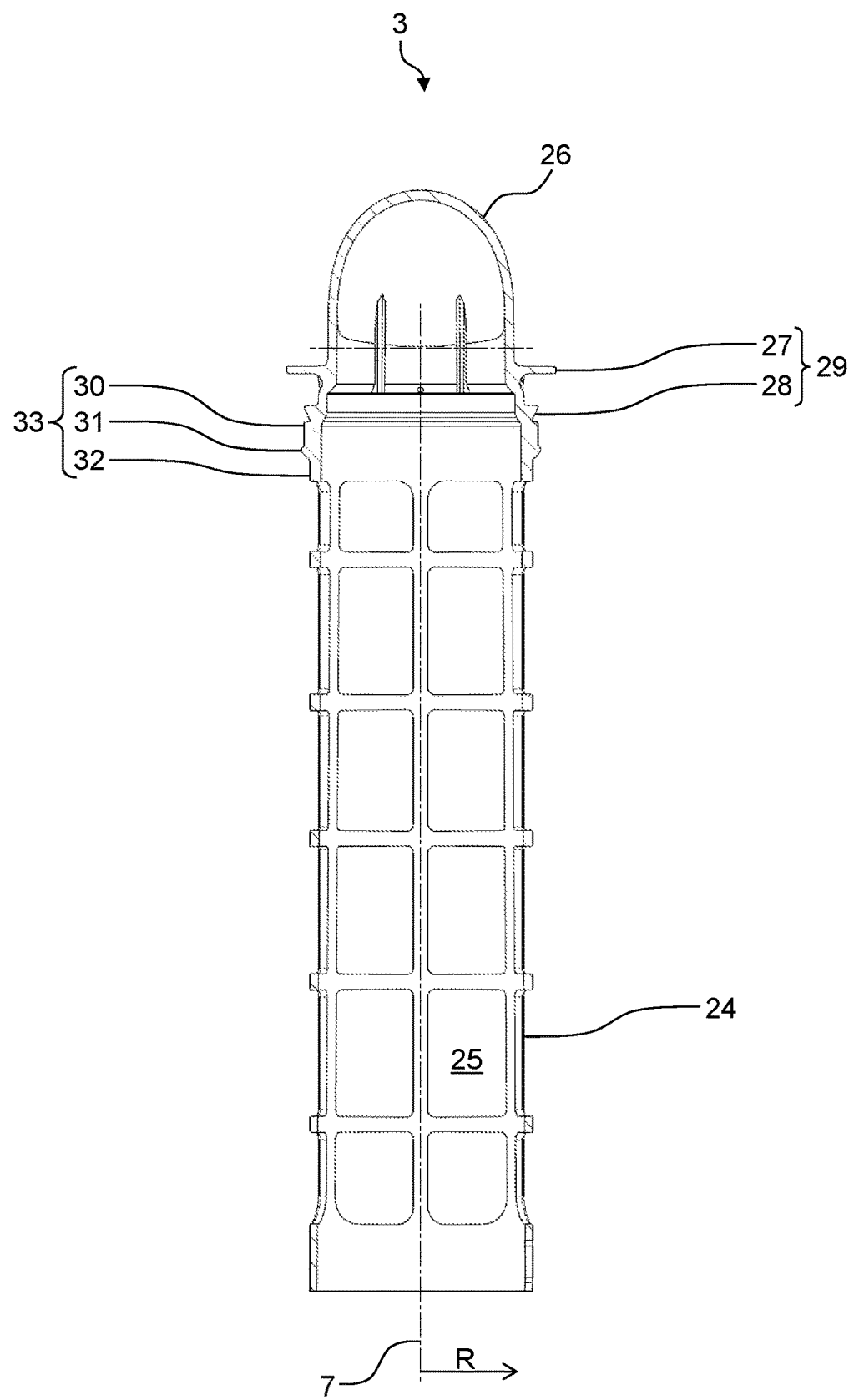
FIG. 8 shows a schematic section view of an embodiment of the fluid outlet for the filter system according to FIG. 1.

FIG. 1 shows a schematic perspective view of an embodiment of the filter system 1A. FIG. 2 shows a schematic partial section view of the filter system 1A. FIG. 3 shows a schematic section view of the filter system 1A. FIG. 4 shows the detail view IV according to FIG. 3. FIG. 5 shows a further schematic section view of the filter system 1A. FIG. 6 shows a schematic section view of an embodiment of a filter housing 2 for the filter system 1A. FIG. 7 shows the detail view VII according to FIG. 6. FIG. 8 shows a schematic section view of an embodiment of a fluid outlet 3 for the filter system 1A. In the following, reference is being had simultaneously to FIGS. 1 through 8.

The filter system 1A can also be referred to as filter arrangement. The filter system 1A can be used as intake air filter for internal combustion engines, for example, in motor vehicles, trucks, construction vehicles, watercraft, rail vehicles, agricultural machines or vehicles, or aircraft. In particular, the filter system 1A is suitable for so-called heavy-duty applications. The filter system 1A can also be used in immobile applications, for example, in building technology. The filter system 1A is in particular suitable for filtering intake air of an internal combustion engine. Preferably, the filter system 1A is an air filter system.

The filter housing 2 comprises a housing bottom part 4 and a housing top part 5. The housing top part 5 can also be referred to as housing cover. The housing top part 5 can be demounted from the housing bottom part 4 and mounted again on the latter. Between the housing bottom part 4 and the housing top part 5, a seal element, for example, in the form of an O-ring, can be provided. The housing top part 5 can comprise quick release fasteners 6 of which in FIGS. 1 and 2 only one is provided with a reference character. The number of quick release fasteners 6 is arbitrary. For example, three such quick release fasteners 6 are provided which are arranged uniformly distributed about the center or symmetry axis 7 of the filter system 1A.

By means of the quick release fasteners 6, the housing top part 5 can be connected releasably to the housing bottom part 4. For this purpose, engagement sections, for example, in the form of hooks or steps, can be provided at the housing bottom part 4 in which the quick release fasteners 6 can engage with form fit for connecting the housing top part 5 to the housing bottom part 4. A form fit connection is produced by mutual engagement or engagement from behind of at least two connecting partners, presently the quick release fasteners 6 and the engagement sections. For example, the housing top part 5 is an injection-molded plastic part.

A dust discharge socket 8 is provided at the housing top part 5. The dust discharge socket 8 is oriented perpendicularly in relation to the symmetry axis 7. A dust discharge valve 9 is provided at the dust discharge socket 8. By means of the dust discharge valve 9, separated coarse particles such as, for example, dust, small stones, plant parts or the like, can be discharged from the filter housing 2. For example, the dust discharge valve 9 can be opened by means of a load change of an internal combustion engine arranged downstream of the filter system 1A.

The housing bottom part 4 is of a cup-shaped embodiment and comprises a cylinder-shaped base section 10 which is constructed with rotational symmetry in relation to the symmetry axis 7. At the end face, the base section 10 is closed by means of a bottom section 11. The base section 10 and the bottom section 11 are formed as one part, in particular monolithically. "One part" or "one piece" means presently that the base section 10 and the bottom section 11 form a common component and are not assembled of different individual components. "Monolithic" means presently that the base section 10 and the bottom section 11 are manufactured throughout of the same material. For example, the housing bottom part 4 is an injection-molded plastic component.

An inflow guard 13 extends out of the bottom section 11 and into an inside 12 of the housing bottom part 4. The inflow guard 13 is hollow cylindrical and constructed with rotational symmetry in relation to the symmetry axis 7. The inflow guard 13 is embodied as one piece, in particular monolithically, with the bottom section 11.

A fluid inlet 14 is integrally formed at the base section 10. The fluid inlet 14 is oriented perpendicularly in relation to the symmetry axis 7. The fluid inlet 14 is embodied as one piece, in particular monolithically, with the base section 10. In a viewing direction from the symmetry axis 7 toward the fluid inlet 14, the inflow guard 13 covers the fluid inlet 14. In this way, it can be prevented that a filter element, still to be explained later on, is directly exposed to a fluid L to be purified, for example, air, which is flowing in through the fluid inlet 14 into the filter housing 2.

The bottom section 11 comprises a substantially circular outlet opening 15 which passes through the bottom section 11. The outlet opening 15 is constructed with rotational symmetry in relation to the symmetry axis 7. The outlet opening 15 forms an inner surface 16 completely surrounding the symmetry axis 7. The inner surface 16 is arranged at a slant or inclined in relation to the symmetry axis 7.

Snap elements 17, of which in FIGS. 6 and 7 only one is provided with a reference character, respectively, project into the outlet opening 15. The snap elements 17 are formed as one piece, in particular monolithically, with the bottom section 11. The number of snap elements 17 is arbitrary. For example, thirteen snap elements 17 are provided which are arranged uniformly distributed around the symmetry axis 7. A respective gap-shaped intermediate space 18 is provided between two snap elements 17 arranged neighboring each other. This means that the snap elements 17 and the intermediate spaces 18 are arranged alternatingly.

The snap elements 17 are resiliently deformable and can be brought from an undeformed state illustrated in FIGS. 6 and 7 into a deformed state, not illustrated, and back. In this context, the snap elements 17 are pretensioned in the direction of the undeformed state, in particular spring preloaded. This means that the snap elements 17 can be brought from the undeformed state into the deformed state by application of a force. As soon as this force is no longer acting, the snap elements automatically rebound from the deformed state back into the undeformed state.

The snap elements 17 are slanted in relation to the symmetry axis 7 at a slant angle $\alpha$. Each snap element 17 comprises an outer side 19 facing the inner surface 16 as well as an inner side 20 facing away from the inner surface 16. The outer sides 19 and the inner sides 20 each are slanted respectively at the slant angle $\alpha$ in relation to the symmetry axis 7.

A receiving flange 21 surrounding completely the symmetry axis 7 is provided at the bottom section 11. The receiving flange 21 is ring-shaped and projects, facing away from the inside 12, out of the bottom section 11. The snap elements 17 and the receiving flange 21 together form a connection interface 22 which is suitable, in a manner to be still explained later on, to interact with the fluid outlet 3 in order to connect the latter with form fit to the housing bottom part 4. Facing away from the bottom section 11, a flange 23 which surrounds completely the symmetry axis 7 and to which the housing top part 5 can be connected is integrally formed at the base section 10.

Now returning to the fluid outlet 3, the latter is suitable to guide purified fluid L, for example, air, out of the filter housing 2 and supply it, for example, to an internal combustion engine. The fluid outlet 3 extends through the outlet opening 15 and is connected with form fit to the housing bottom part 4. The fluid outlet 3 comprises a tubular central tube section or support tube section 24 which projects into the inside 12 and is constructed with rotational symmetry in relation to the symmetry axis 7. The support tube section 24 is fluid-permeable. For this purpose, the support tube section 24 is of a lattice-shaped configuration and comprises a plurality of openings or passages 25.

In addition to the support tube section 24, the fluid outlet 3 comprises a socket section 26 which is configured as one piece, in particular monolithically, with the support tube section 24. For example, the fluid outlet 3 is an injection-molded plastic component. The socket section 26 is oriented perpendicularly in relation to the symmetry axis 7 and enables in this way a deflection of the purified fluid L by 90°. The socket section 26 is arranged outside of the inside 12. The fluid outlet 3 can be part of the filter housing 2. The fluid outlet 3 can also be not bent but straight.

The fluid outlet 3 comprises a flange 27 which is disk-shaped and completely surrounds the symmetry axis 7. The flange 27 is integrally formed at the top side on the support tube section 24. The flange 27 can thus be positioned between the support tube section 24 and the socket section 26. The flange 27 can be received in the receiving flange 21 of the housing bottom part 4.

In the orientation of FIG. 8, an engagement section 28 in which the snap elements 17 can engage with form fit is provided below the flange 27. For this purpose, the engagement section 28 is configured as an annular groove which surrounds completely the symmetry axis 7 and can be integrally formed at the top side on the support tube section 24. The flange 27 and the engagement section 28 form a connection counter interface 29 which is suitable to interact with the connection interface 22 in order to connect the fluid outlet 3 with form fit to the housing bottom part 4.

For connecting the fluid outlet 3 to the housing bottom part 4, the support tube section 24 is inserted through the outlet opening 15 into the housing bottom part 4 until the flange 27 of the connection counter interface 29 of the fluid outlet 3 is received in the receiving flange 21 of the connection interface 22 of the housing bottom part 4. The flange 27 rests then at the end face at the bottom section 11. In this context, the snap elements 17 snap into or lock in the engagement section 28 of the connection counter interface 29 so that the fluid outlet 3 is connected with form fit to the housing bottom part 4. The fluid outlet 3 can be separated again from the housing bottom part 4 only when the snap elements 17, for example, by means of a tool, are deformed such that they become disengaged from the engagement section 28. The fluid outlet 3 can be rotated in relation to the housing bottom part 4.

In the orientation of FIG. 8, a cylinder-shaped seal surface 30 is provided at the fluid outlet 3 below the engagement section 28 and surrounds completely the symmetry axis 7. A rib 31 surrounding the symmetry axis 7 adjoins the seal surface 30 and, viewed in a radial direction R, projects radially past the seal surface 30. In the orientation of FIG. 8, a cylinder-shaped outer surface 32 is provided below the rib 31 and surrounds completely the symmetry axis 7. The seal surface 30, the rib 31, and the outer surface 32 form a seal interface 33 of the fluid outlet 3 which is suitable to interact with a filter element 34 of the filter system 1A receivable in the filter housing 2.

The filter element 34 is constructed with rotational symmetry in relation to the symmetry axis 7. The filter element 34 comprises a filter medium 35 which is cylinder-shaped. The filter medium 35 is constructed with rotational symmetry in relation to the symmetry axis 7. For example, the filter medium 35 can be of an annularly closed configuration and can be present in the form of a star-shaped folded filter bellows. The filter medium 35 is thus preferably folded.

The filter element 34 has associated therewith a longitudinal direction LR. In this context, the longitudinal direction LR is oriented along the symmetry axis 7. In the orientation of FIGS. 2 to 4, the longitudinal direction LR can be oriented from the bottom to the top. The longitudinal direction LR can however also be oriented in reverse. The filter medium 35 has associated therewith a first end face 36 and a second end face 37. The longitudinal direction LR can be oriented from the second end face 37 in the direction toward the first end face 36.

The filter medium 35 is, for example, a filter paper, a filter fabric, a laid filter material, or a filter nonwoven. In particular, the filter medium 35 can be produced by a spunlaid nonwoven method or meltblown method or can comprise such a fiber layer applied onto a nonwoven carrier or cellulose carrier. Furthermore, the filter medium 35 can be felted or needled. The filter medium 35 can comprise natural fibers, such as cellulose or cotton, or synthetic fibers, for example, of polyester, polyvinyl sulfite or polytetrafluoroethylene. During processing, fibers of the filter medium 35 can be oriented in, at a slant to and/or transversely to or randomly in relation to a machine direction.

The filter element 34 comprises a first, in particular open, end disk 38 provided at the first end face 36 of the filter medium 35. Furthermore, the filter element 34 comprises a second, in particular closed, end disk 39 which is provided at the second end face 37 of the filter medium 35. This means that the filter medium 35 is positioned between the first end disk 38 and the second end disk 39. The end disks 38, 39 can be manufactured, for example, of a polyurethane material which is in particular cast in casting molds, preferably foamed. The end disks 38, 39 can be cast onto the filter medium 35. The first end disk 38 is connected to the first end face 36. The second end disk 39 is connected to the second end face 37.

The first end disk 38 comprises a centrally arranged passage 40. The fluid outlet 3, in particular the support tube section 24, is passed through the passage 40. The passage 40 can be an outflow opening of the filter element 34. The first end disk 38 is plate-shaped. Facing away from the first end face 36 of the filter medium 35, a ring-shaped positioning and sealing section 41 of the first end disk 38 extends away from the latter, viewed along the longitudinal direction LR, and surrounds the symmetry axis 7. By means of the positioning and sealing section 41, the filter element 34 can be positioned in the filter housing 2 and sealed in relation thereto, as will still be explained in the following. The passage 40 penetrates also the positioning and sealing section 41.

As illustrated in FIG. 4, the first end disk 38, respectively, the positioning and sealing section 41 comprises at the inner side, i.e., facing the passage 40, a cylinder-shaped seal surface 42 which is constructed with rotational symmetry in relation to the symmetry axis 7 and completely surrounds it. The seal surface 42 is suitable to be compressed radially in relation to the seal surface 30 of the seal interface 33 of the fluid outlet 3 in order to thus fluid-tightly seal the first end disk 38 in relation to the seal surface 30. "Radial" means in this context in the direction of the radial direction R which is oriented perpendicularly in relation to the symmetry axis 7 and is facing away from the latter. In addition, the first end disk 38 also seals axially, i.e., viewed along the longitudinal direction LR, in relation to the bottom section 11 in that the first end disk 38 is pressed at the end face against the bottom section 11.

Furthermore, the first end disk 38, respectively, the positioning and sealing section 41 comprises a contact surface 43 which is slanted at a slant angle α in relation to the symmetry axis 7 and completely surrounds the latter and which rests at the outer side, i.e., at the outer sides 19 of the snap elements 17, at the snap elements 17 and presses them into the engagement section 28 of the connection counter interface 29 of the fluid outlet 3.

In this way, relative movements of the fluid outlet 3, for example, due to vibrations, in relation to the housing bottom part 4 can be advantageously suppressed or at least reduced. This leads to a noise reduction and to a reduced wear of the snap elements 17. The positioning and sealing section 41 thus rests in a supporting and damping manner at the snap elements 17. The positioning and sealing section 41 prevents also an undesirable deformation of the snap elements 17 in such a way that they become disengaged from the engagement section 28. An accidental release of the fluid outlet 3 from the housing bottom part 4 is thus reliably prevented.

At the seal surface 42, a groove 44 surrounding the symmetry axis 7 is integrally formed in which the rib 31 of the seal interface 33 of the fluid outlet 3 engages with form fit. In the orientation of FIG. 4, an inner surface 45 at which the outer surface 32 of the seal section 33 can rest is provided below the groove 44. The seal surface 42, the groove 44, and the inner surface 45 can form a seal counter interface 46 of the filter element 34 which, in the afore described way, interacts so as to fluid-tightly seal with the seal interface 33 of the fluid outlet 3. The contact surface 43 can also be part of the seal counter interface 46.

At the outer side, i.e., facing away from the seal surface 42, the positioning and sealing section 41 rests at the inner surface 16 of the outlet opening 15 (FIG. 4). In this context, the positioning and sealing section 41 comprises a plurality of depressions or recesses 48 which are arranged uniformly distributed around the symmetry axis 7 and in which engagement elements provided at the inner surface 16 and extending radially in the direction toward the symmetry axis 7 engage with form fit. By means of these recesses 48 and the engagement elements, an angularly precise positioning of the filter element 34 in relation to the housing bottom part 4 is possible. Moreover, it can also be prevented that filter elements not belonging to the filter system 1A can be installed in the housing bottom part 4. Thus, the positioning and sealing section 41 not only provides a sealing function but also a positioning function.

Now returning to the also plate-shaped second end disk 39, the latter is constructed with rotational symmetry in relation to the symmetry axis 7 and closes the second end face 37 of the filter medium 35 fluid-tightly. Facing away from the second end face 37, positioning elements 47, of which in FIG. 3 only one is provided with a reference character, project out of the second end disk 39. The number of the positioning elements 47 is arbitrary. For example, five such positioning elements 47 can be provided which are arranged uniformly distributed around the symmetry axis 7.

The function of the filter element 34, respectively, of the filter system 1A will be explained in the following with the aid of FIG. 3. Fluid L to be purified, for example, air, is sucked in through the fluid inlet 14 into the filter housing 2, in particular into the inside 12, and then passes from a raw side RO of the filter element 34 through the filter medium 35 to a clean side RL of the filter element 34 which is surrounded by the filter medium 35, respectively, by the support tube section 24. In doing so, particles, for example, dust or the like, are separated from the fluid L. The support tube section 24 supports the filter medium 35 at the inner side. The purified fluid L flows out of the filter element 34 through the fluid outlet 3 out of the filter housing 2 and can be supplied, for example, to an internal combustion engine.

Figure 9:
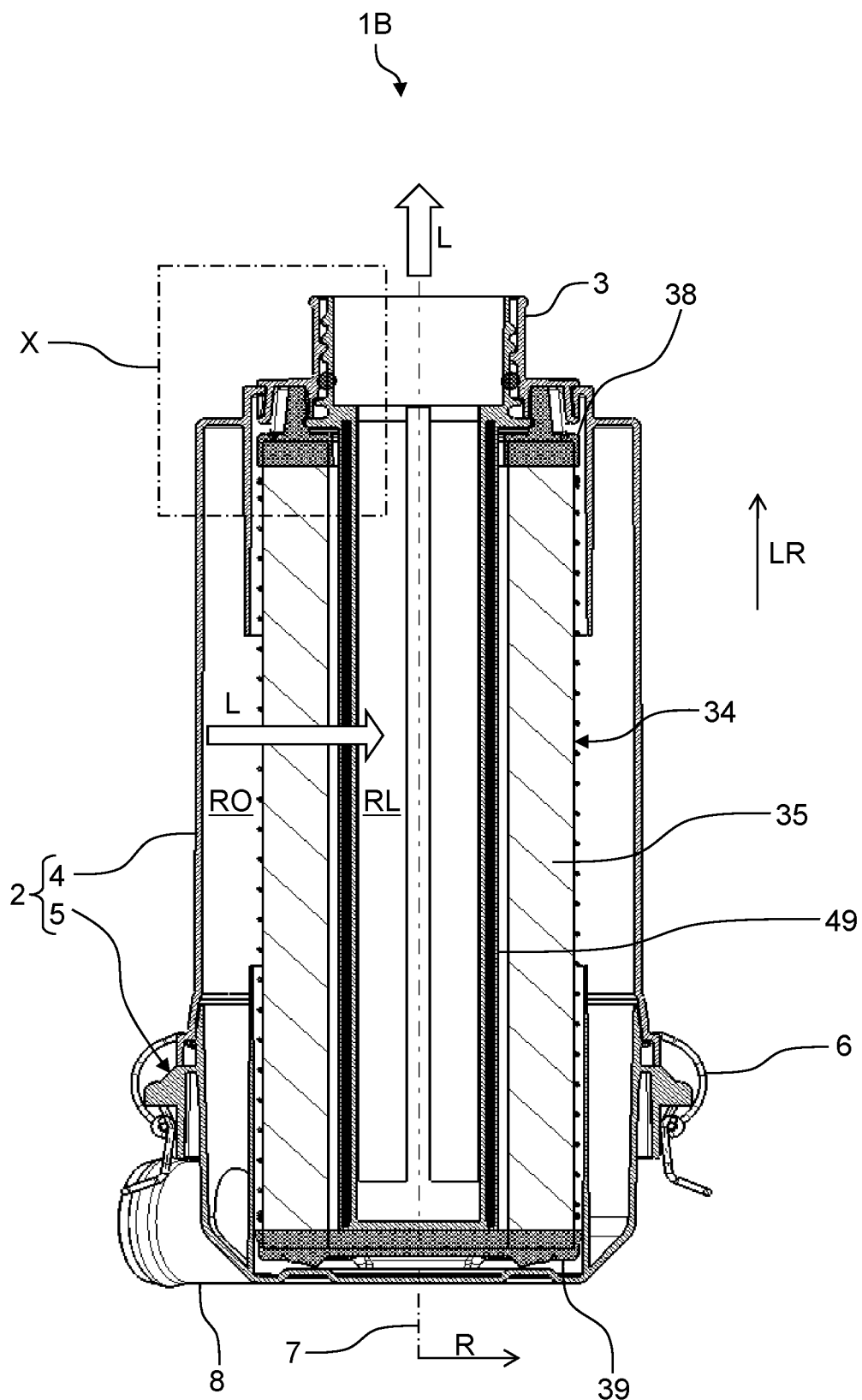
FIG. 9 shows a schematic section view of a further embodiment of a filter system.
Figure 10:
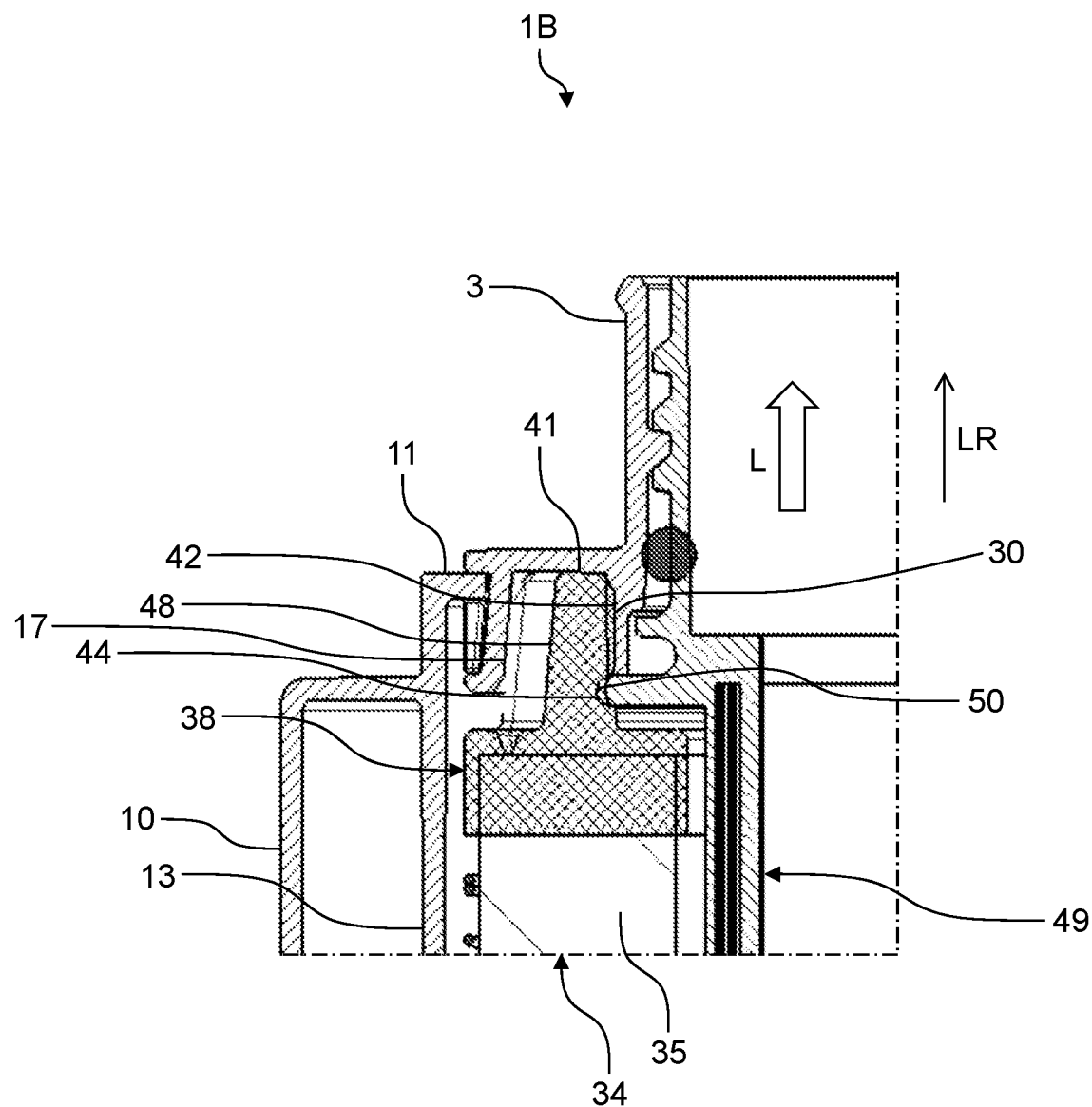
FIG. 10 shows the detail view X according to FIG. 9.

FIG. 9 shows a schematic section view of a further embodiment of a filter system 1B. FIG. 10 shows the detail view X according to FIG. 9. In the following, reference is being had simultaneously to FIGS. 9 and 10. In the following, the differences of the filter system 1B in comparison to the filter system 1A will be explained.

The fluid outlet 3 in the filter system 1B comprises no support tube section 24. Instead, a secondary filter element 49 is provided which is received in the filter element 34. The secondary filter element 49 is connected with form fit to the fluid outlet 3, for example, locked to the latter. The secondary filter element 49 comprises a rib 50 surrounding the symmetry axis 7 and engaging with form fit the groove 44 of the positioning and sealing section 41 of the first end disk 38 and sealing radially in relation to the latter. The fluid outlet 3 has no bend but extends along the symmetry axis 7.

The snap elements 17 are not provided at the housing bottom part 4 but at the fluid outlet 3 and locked with form fit at the housing bottom part 4. The positioning and sealing section 41 pushes, viewed along the radial direction R, from the inside against the snap elements 17 so that the form fit connection between the fluid outlet 3 and the housing bottom part 4 cannot release accidentally. In the illustrated embodiment, the positioning and sealing section 41 comprises notches 339, as known, for example, from WO2012172019A1, at its radially positioned outer side, wherein the sections illustrated in FIGS. 9-11 each extend through such a notch. In the region of the notches 339, the radial extension of the positioning and sealing section 41 is reduced. In the regions 340 of the positioning and sealing section 41 in which no notch 339 is arranged, the positioning and sealing section 41, viewed along the radial direction R, pushes from the inside against the snap elements 17 or at least rests at the latter.

Figure 11:
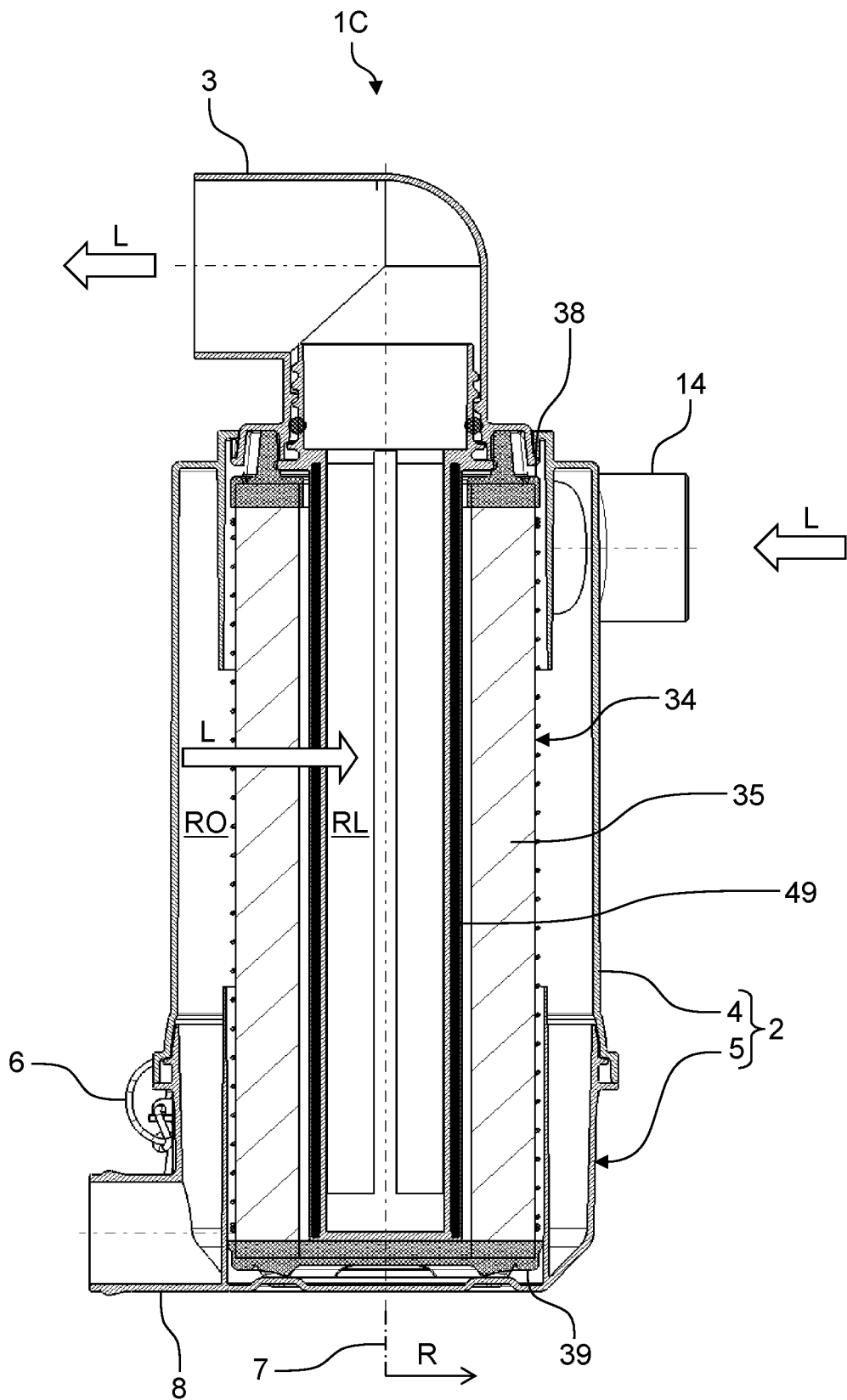
FIG. 11 shows a schematic section view of a further embodiment of a filter system.

FIG. 11 shows a schematic section view of a further embodiment of a system 1C. The filter system 1C differs from the filter system 1B only in that the fluid outlet 3, as in the filter system 1A, is bent by 90° and thus oriented perpendicularly in relation to the symmetry axis 7.

EMPLOYED REFERENCE CHARACTERS 1A filter system
1B filter system
1C filter system
2 filter housing
3 fluid outlet
4 housing bottom part
5 housing top part
6 quick release fastener
7 symmetry axis
8 dust discharge socket
9 dust discharge valve
10 base section
11 bottom section
12 interior
13 inflow guard
14 fluid inlet
15 outlet opening
16 inner surface
17 snap element
18 intermediate space
19 outer side
20 inner side
21 receiving flange
22 connection interface
23 flange
24 support tube section
25 passage
26 socket section
27 flange
28 engagement section
29 connection counter interface
30 seal surface
31 rib
32 outer surface
33 seal interface
34 filter element
35 filter medium
36 end face
37 end face
38 end disk
39 end disk
40 passage
41 positioning and sealing section
42 seal surface 43 contact surface
44 groove
45 inner surface
46 seal counter interface
47 positioning element
48 recess
49 secondary filter element
50 rib
339 notch
340 regions of the positioning and sealing section 41 in which no notch 339 is arranged
L fluid
LR longitudinal direction
R radial direction
RL clean side
RO raw side
α slant angle

What is claimed is:

1. A filter system comprising:
a filter housing comprising a fluid inlet configured to introduce a fluid into the filter housing;
a fluid outlet configured to discharge the fluid from the filter housing;
a filter element removably received in the filter housing, wherein the filter element comprises a positioning and sealing section configured to position and to seal the filter element in relation to the filter housing;
elastically deformable snap elements configured to connect the filter housing and the fluid outlet together so that the fluid outlet is connected with a form fit to the filter housing in an engagement section;
wherein the positioning and sealing section is arranged at a radially outer side of the elastically deformable snap elements and comprises a radially inward seal surface.

2. The filter system according to claim 1, wherein the positioning and sealing section presses radially against the elastically deformable snap elements to engage the elastically deformable snap elements with the fluid outlet.

3. The filter system according to claim 1, wherein the elastically deformable snap elements engage with the fluid outlet in the form fit in the engagement section.

4. The filter system according to claim 3, wherein the elastically deformable snap elements are provided at a housing bottom part of the filter housing and wherein the engagement section is provided at the fluid outlet.

5. The filter system according to claim 1, wherein the elastically deformable snap elements are provided at the fluid outlet and wherein the engagement section is provided at a housing bottom part of the filter housing.

6. The filter system according to claim 3, wherein the elastically deformable snap elements each comprise a side facing the engagement section and a side facing away from the engagement section, and wherein the positioning and sealing section presses radially at the sides of the elastically deformable snap elements facing away from the engagement section.

7. The filter system according to claim 3, wherein the filter housing comprises a housing bottom part provided with a ring-shaped receiving flange, wherein the elastically deformable snap elements are arranged at the housing bottom part, and wherein the ring-shaped receiving flange and the elastically deformable snap elements form a connection interface of the housing bottom part.

8. The filter system according to claim 7, wherein the fluid outlet comprises a disk-shaped flange, wherein the engagement section is provided at the fluid outlet, wherein the disk-shaped flange and the engagement section form a connection counter interface of the fluid outlet, and wherein the connection interface of the housing bottom part and the connection counter interface of the fluid outlet interact with each other such that the elastically deformable snap elements engage the fluid outlet with the form fit in the engagement section and the disk-shaped flange is received in the ring-shaped receiving flange.

9. The filter system according to claim 1, wherein the elastically deformable snap elements are slanted at a slant angle in relation to a symmetry axis of the filter system.

10. The filter system according to claim 9, wherein the positioning and sealing section comprises a contact surface and the contact surface is pressed radially against the elastically deformable snap elements, wherein the contact surface is slanted at a slant angle in relation to the symmetry axis, wherein the slant angle of the contact surface and the slant angle of the elastically deformable snap elements are identical.

11. The filter system according to claim 1, wherein the fluid outlet is rotatable relative to a housing bottom part of the filter housing.

12. The filter system according to claim 1, wherein the fluid outlet comprises a seal interface, wherein the positioning and sealing section comprises a seal counter interface, wherein the seal interface radially compresses the seal counter interface of the positioning and sealing section.

13. The filter system according to claim 1, wherein the fluid outlet comprises a lattice-shaped support tube section projecting into the filter element and further comprises a socket section projecting out of the filter housing.

14. The filter system according to claim 13, wherein the socket section is bent by 90° in relation to a symmetry axis of the filter system.

15. A filter element for a filter system according to claim 1, wherein the filter element is configured to be received removably in the filter housing of the filter system, the filter element comprising a positioning and sealing section configured to position and seal the filter element in relation to the filter housing, wherein the positioning and sealing section is arranged radially outwardly at the elastically deformable snap elements of the filter system in a mounted state of the filter element in the filter housing, and wherein the positioning and sealing section presses radially inwardly against the elastically deformable snap elements to engage the filter housing with the fluid outlet.

* * * * *